(No Model.)
W. H. OWEN.
METAL WORKING TOOL.
No. 513,954. Patented Jan. 30, 1894.
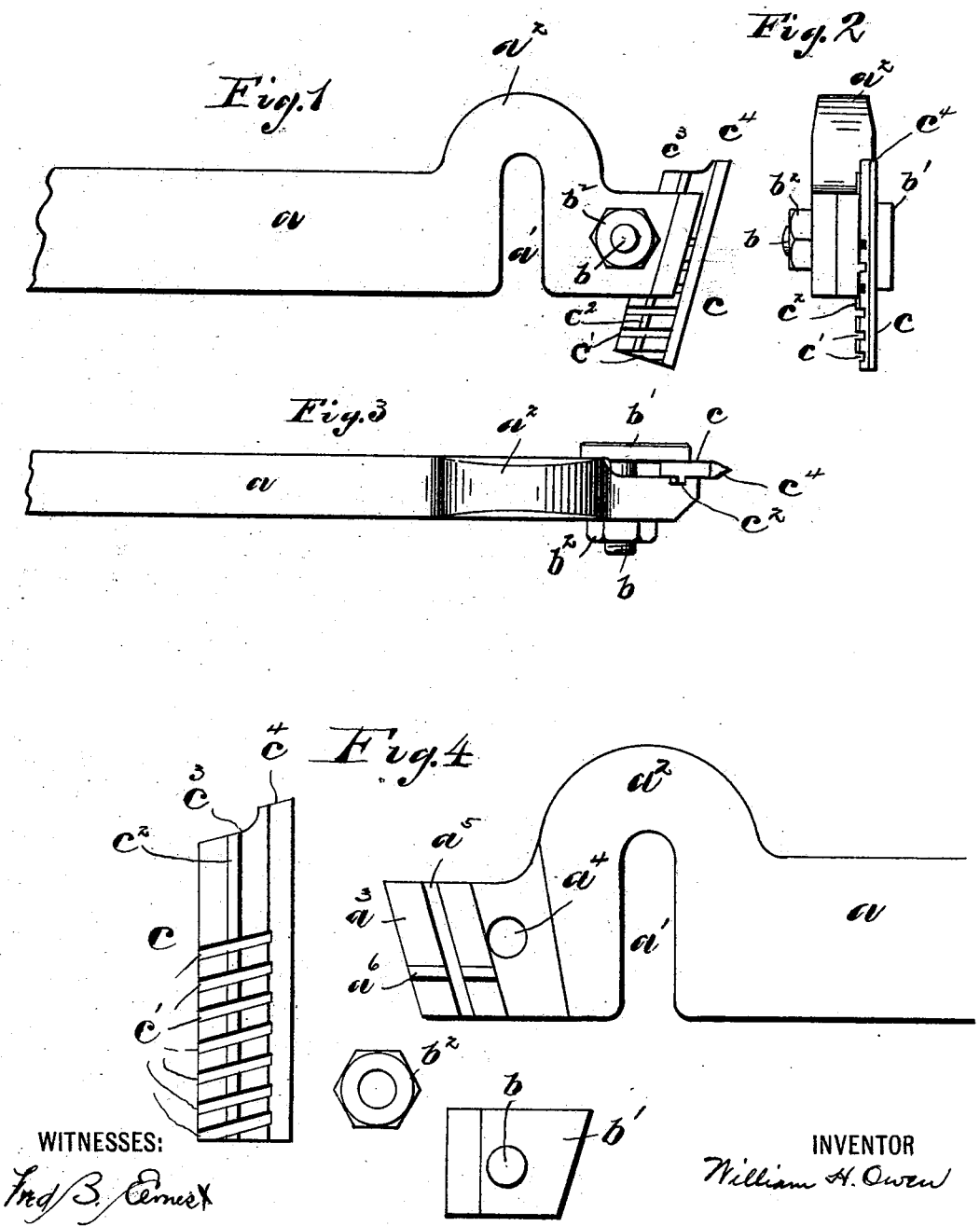
WITNESSES:
INVENTOR
William H. Owen
BY
ATTORNEYS

UNITED STATES PATENT OFFICE.

WILLIAM H. OWEN, OF SPRINGFIELD, OHIO.

METAL-WORKING TOOL.

SPECIFICATION forming part of Letters Patent No. 513,954, dated January 30, 1894.

Application filed October 12, 1893. Serial No. 487,960. (No model.)

*To all whom it may concern:*

Be it known that I, WILLIAM H. OWEN, a citizen of the United States, residing at Springfield, in the county of Clark and State of Ohio, have invented certain new and useful Improvements in Metal-Working Tools, of which the following is a specification.

My invention relates to improvements in tools adapted for use in lathes, planers, shapers and similar metal working machines; the invention being especially adapted for use as a screw cutting tool for lathes.

My invention consists in the various constructions and combinations of parts hereinafter described and pointed out in the claims.

In the accompanying drawings Figure 1 is a side elevation of a tool embodying my invention. Fig. 2 is an end elevation and Fig. 3 a plan of the same. Fig. 4 is a side view on an enlarged scale of the respective parts which form the tool, shown detached.

Like parts are represented by similar letters of reference in the several views.

In the said drawings $a$, represents the main body or frame of the tool, which is preferably forged from steel of a suitable size and shape to fit in an ordinary lathe or planer tool holder. This body or frame $a$, is formed near its front end with a lateral opening $a'$ and a curved connecting portion $a^2$. The frame is further cut away at the front end on one side, as shown, to form a jaw or bearing face $a^3$, and is provided with a perforation $a^4$, adapted to receive a stud or bolt $b$, having an enlarged head or clamping plate $b'$, preferably formed integral with the bolt. The bolt or stud $b$, extends through the opening $a^4$, and is provided with a nut $b^2$. The bearing face $a^3$, is provided with a transverse slot $a^5$, which extends transversely across the body of the tool $a$, at an angle preferably corresponding to the angle of the end of said frame or body. It is further provided with an upwardly extending rib $a^6$, which extends across said bearing face preferably in a plane parallel with the main body of the tool. Located between the clamping plate $b'$, and the bearing face $a^3$, is the cutting bit $c$, having a series of transverse grooves or notches $c'$, on one face thereof, and provided with a longitudinal rib $c^2$, which extends through the entire length of said bit, except where it is intercepted by the notches $c'$. These notches $c'$ are adapted to fit over the rib or projection $a^6$, in the frame or body. The rib or projection $c^2$, is adapted to fit in the groove $a^5$. By tightening the nut $b^2$, the clamping plate $b'$, is drawn up firmly against the bit $c$, and thus clamps the same tightly in the frame $a$.

In operation the cutting edge of the bit $c$, is arranged slightly below the top of the slotted opening $a'$. The curved connecting portion $a^2$, which connects the clamping jaw with the main body $a$, is adapted to yield under a severe strain, and by the yielding movement thus permitted, the cutting edge is withdrawn slightly from the work, preventing the catching and breaking of the bit.

I have shown in the drawings the cutting bit $c$, as employed for screw cutting. It is obvious, however, that it may be modified to suit any work to be performed. The upper end of the cutting tool is preferably cut away, as shown at $c^3$, to form a cutting edge $c^4$, so that when the tool becomes dull, it is only necessary to grind the portion $c^4$, in order to restore the cutting edge. As the portion $c^4$, becomes worn away, the tool may be further cut out at $c^3$, and adjusted upwardly, by reason of the notches $c'$, until the entire bit is used up, when the bit may be replaced without renewing the entire tool.

It will be seen from the above description that the tool thus produced is extremely simple and capable of ready adjustment to the work to be performed.

Having thus described my invention, I claim—

The main body having the lateral groove and the clamping jaw, the yielding arch over said groove formed integral with said body and adapted to connect the same to said jaw, a stud having an enlarged head or clamping plate, and a bit adapted to be clamped between said plate and said jaw, said bit having a longitudinal rib and lateral grooves, said jaw being provided with a lateral groove and a longitudinal rib, substantially as specified.

In testimony whereof I have hereunto set my hand this 7th day of October, A. D. 1893.

WILLIAM H. OWEN.

Witnesses:
ROBERT C. RODGERS,
FRANK WATT.